(12) United States Patent
Winbow et al.

(10) Patent No.: US 6,691,075 B1
(45) Date of Patent: Feb. 10, 2004

(54) METHOD FOR MODELING SEISMIC ACQUISITION FOOTPRINTS

(75) Inventors: Graham A. Winbow, Houston, TX (US); William A. Schneider, Jr., Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/521,295

(22) Filed: Mar. 9, 2000

Related U.S. Application Data
(60) Provisional application No. 60/124,054, filed on Mar. 12, 1999.

(51) Int. Cl.[7] .............................. G06F 7/48; G06F 7/50; G06F 7/60; G01V 1/28
(52) U.S. Cl. ................. 703/2; 703/9; 703/10; 703/6; 702/14; 702/16; 702/17; 702/18; 367/73; 367/14; 367/25
(58) Field of Search .............................. 703/2, 6, 9, 10; 702/14, 16, 17, 18; 367/14, 25, 47, 38, 28, 73, 24, 53; 81/104, 106, 111, 112, 113, 122; 324/366, 323

(56) References Cited

U.S. PATENT DOCUMENTS

| | | | | |
|---|---|---|---|---|
| 4,878,205 A | * | 10/1989 | Gelchinsky | 367/51 |
| 4,975,704 A | * | 12/1990 | Gabriel et al. | 342/25 |
| 5,051,960 A | * | 9/1991 | Levin | 367/38 |
| 5,062,086 A | * | 10/1991 | Harlan et al. | 367/73 |
| 5,206,837 A | * | 4/1993 | Beasley et al. | 367/38 |
| 5,671,136 A | * | 9/1997 | Willhoit, Jr. | 702/18 |
| H1693 H | * | 11/1997 | Thornton et al. | 702/17 |
| 5,693,885 A | * | 12/1997 | Neidell | 702/14 |
| 5,835,452 A | * | 11/1998 | Mueller et al. | 702/14 |
| 5,987,387 A | * | 11/1999 | Dickens et al. | 702/14 |
| 6,178,381 B1 | * | 1/2001 | Padhi et al. | 702/18 |
| 6,324,478 B1 | * | 11/2001 | Popovici et al. | 702/18 |
| 6,343,256 B1 | * | 1/2002 | Winbow et al. | 702/18 |

FOREIGN PATENT DOCUMENTS

| WO | WO 00/54074 | * | 9/2000 |
|---|---|---|---|

OTHER PUBLICATIONS

Schneider, Jr. Analyzing Operators of 3–D Imaging Software with Impulse Response, Geophysics, Jul–Aug. 1999.*
Thore et al., Fresnel Zone Effect on Seismic Velocity Resolution, Geophysics, Mar.–Apr. 1999.*
Taner et al., A Unified Method for 2–D and 3–D Refraction Statistics, Geophysics, Jan.–Feb. 1998.*
Lee et al., Split–step Fouier Shot–Record Migration with Deconvolution Imaging, Geophysics, Nov. 1991.*
Tygel et al., A Unified Approach t 3–D Seismic Reflection Imaging, Part II, Theory, Geophysics, May–Jun. 1996.*
Hilterman, Interpretative Lessons from Three–Dimensional Modeling, Geophysics, May 1982.*

* cited by examiner

*Primary Examiner*—W. D. Thomson
(74) *Attorney, Agent, or Firm*—Charles R. Schweppe

(57) ABSTRACT

A model seismic image of a subsurface seismic reflector is constructed, wherein a set of source and receiver pairs is located, and a subsurface velocity function is determined. Specular reflection points are determined on the subsurface seismic reflector for each of the source and receiver pairs. A Fresnel zone is determined on the subsurface seismic reflector for each of the specular reflection points, using the subsurface velocity function. One or more seismic wavelets are selected and a set of image points is defined containing the subsurface seismic reflector. A synthetic seismic amplitude is determined for each of the image points by summing the Fresnel zone synthetic seismic amplitude for all of the Fresnel zones that contain the image point, using the seismic wavelets. The model seismic image of the subsurface seismic reflector is constructed, using the synthetic seismic amplitudes at the image points.

6 Claims, 8 Drawing Sheets

METHOD FOR MODELING SEISMIC ACQUISITION FOOTPRINTS

This application claims the benefit of U.S. Provisional Application No. 60/124,054 filed Mar. 12, 1999.

FIELD OF THE INVENTION

This invention relates generally to the field of seismic prospecting. More particularly, the invention relates to a method for constructing a model seismic image of a subsurface seismic reflector.

BACKGROUND OF THE INVENTION

In the oil and gas industry, seismic prospecting techniques are commonly used to aid in the search for and evaluation of hydrocarbon deposits located in subterranean formations. In seismic prospecting, seismic energy sources are used to generate a seismic signal which propagates into the earth and is at least partially reflected by subsurface seismic reflectors. Such seismic reflectors typically are interfaces between subterranean formations having different elastic properties. The reflections are caused by differences in elastic properties, specifically wave velocity and rock density, which lead to differences in impedance at the interfaces. The reflections are recorded by seismic detectors at or near the surface of the earth, in an overlying body of water, or at known depths in boreholes. The resulting seismic data may be processed to yield information relating to the geologic structure and properties of the subterranean formations and potential hydrocarbon content.

The goal of all seismic data processing is to extract from the data as much information as possible regarding the subterranean formations. In order for the processed seismic data to fully represent geologic subsurface properties, the true amplitudes resulting from reflection of the input signal by the geologic target must be accurately represented. This requires that the amplitudes of the seismic data must be processed free from non-geologic seismic effects. Non-geologic amplitude effects include mechanisms that cause the measured seismic amplitudes to deviate from the amplitude caused by the reflection coefficient of the geologic target. These non-geologic amplitude effects can be related to acquisition of the data or to near surface effects. Examples of non-geologic amplitude effects that can be particularly troublesome are source and receiver variation, coherent noises, electrical noise or spikes, and overburden and transmission effects. If uncorrected, these effects can dominate the seismic image and obscure the true geologic picture.

A seismic wave source generates a wave that reflects from or "illuminates" a portion of a reflector. The collection of sources that comprises an entire 3-D survey generally illuminates a large region of the reflector. Conventional prestack 3-D migration algorithms can produce precise images of the reflector only if illumination is relatively uniform. Lateral velocity variations within the earth and nonuniformly sampled 3-D prestack seismic data, however, generally cause reflectors to be illuminated nonuniformly. Nonuniform illumination is generally due to varying azimuths and source-receiver midpoint locations. Consequently, prestack 3-D migrated images are often contaminated with non-geologic artifacts called an "acquisition footprint". These artifacts can interfere with the ultimate interpretation of seismic images and attribute maps. Understanding and removing the effects of the acquisition footprint has thus become important for seismic acquisition design, processing, and interpretation.

Let $\vec{S} = (S_1, S_2)^T$ and $\vec{G} = (G_1, G_2)^T$ denote two-dimensional coordinate vectors of a seismic source, commonly called a shot, and a seismic receiver, typically a geophone, respectively. These vectors $\vec{S}$ and $\vec{G}$ are defined with respect to a global Cartesian coordinate system $\vec{x} = (x, y, z)$ in the plane given by z=0. Schleicher et al., "3-D True-Amplitude Finite-Offset Migration", Geophysics, 58, 1112–1126, (1993) showed that for any specified measurement configuration of sources and receivers, the vector pair $(\vec{S}, \vec{G})$ can be described by a single position vector $\vec{\xi} = (\xi_1, \xi_2)^T$ according to the following relations $$\vec{S}(\vec{\xi}) = \vec{S}_0 + \Gamma_S(\vec{\xi} - \vec{\xi}_0)$$

and $$\vec{G}(\vec{\xi}) = \vec{G}_0 + \Gamma_G(\vec{\xi} - \vec{\xi}_0).$$

Here $\vec{S}_0$ and $\vec{G}_0$ are coordinate vectors describing a fixed source-receiver pair $(\vec{S}_0, \vec{G}_0)$ defined by position vector $\vec{\xi} = \vec{\xi}_0$. Configuration matrices $\Gamma_S$ and $\Gamma_G$ are 2×2 constant matrices, depending only upon the measurement configuration. The configuration matrices are determined by $$\Gamma_{S_{ij}} = \frac{\partial S_i}{\partial \xi_j} \quad \text{and}$$

$$\Gamma_{G_{ij}} = \frac{\partial G_i}{\partial \xi_j}, \quad \text{for } i = 1, 2 \text{ and } j = 1, 2.$$

Examples of sets of configuration matrices for particular measurement configurations are:

$\Gamma_S = I$ and $\Gamma_G = I$ for common offset configuration,
$\Gamma_S = 0$ and $\Gamma_G = I$ for common shot configuration, and
$\Gamma_S = I$ and $\Gamma_G = 0$ for common receiver configuration.

Here I is the 2×2 identity matrix and 0 is the 2×2 zero matrix.

As discussed by Schleicher et al., (1993), supra, common offset 3-D migration can be formulated as a weighted summation along the diffraction traveltime surface, $\tau_D$, also called the Huygens surface, through the following Kirchhoff migration equation $$U(\vec{x}) = \sum_j \Delta \vec{\xi}_j w(\vec{\xi}_j, \vec{x}) \dot{U}(\vec{\xi}_j, t + \tau_D(\vec{\xi}_j, \vec{x}))\Big|_{t=0} . \quad (1)$$

Here U is the seismic amplitude sum; $\vec{x}$ is the image point; $\vec{\xi}_j$ is the source-receiver midpoint for trace j; w is a weight chosen to preserve seismic amplitudes; and $\tau_D$ is the diffraction traveltime connecting source S, image point Q, and receiver G. The dot above U on the right hand side of equation (1) represents time differentiation. The term $\Delta \vec{\xi}_j$ in migration equation (1) is the two-dimensional element of surface area representing trace j, indicating that this equation is a discretized integral formula. Neglect of variations in $\Delta \vec{\xi}_j$, caused by variations in source-receiver midpoint distribution, is in practice a significant cause of acquisition footprints. Migration implemented by equation (1) is referred to in the literature as "True Amplitude Kirchhoff Migration".

Consider an image volume consisting of N points in each of the x, y, and z directions. Then imaging with migration equation (1) is an $O(N^5)$ process, because the two-dimensional summations over $\vec{\xi}_j$ must be performed at each point $\vec{x}$ of the three-dimensional image space. $O(N^5)$ processes such as migration equation (1) must usually be implemented on supercomputers or on parallel networks of fast workstations.

Migration equation (1) only produces a good image under the assumptions that the source-receiver offset and azimuth are fixed in magnitude within a narrow range, and the data coverage is dense in $\vec{\xi}_j$-space. This last assumption means that there are no large data gaps, which would give large $\Delta \vec{\xi}_j$ values. Failure of the data or the migration implementation to meet these assumptions generally results in an image that is contaminated with an acquisition footprint.

Schleicher et al., (1993), supra, show that synthetic seismic data may be written for one reflector and a collection of sources and receivers as the following data equation $$U(\vec{\xi}_j, t) = R(\vec{\xi}_j) g(t - \tau_R(\vec{\xi}_j)) / \Lambda(\vec{\xi}_j). \tag{2}$$

Here R is the reflection coefficient for the reflector, g(t) represents the seismic wavelet, $\tau_R$ is the reflection traveltime, and $\Lambda$ is the geometrical spreading. If there were more than one reflector, an additional factor to account for the total loss in amplitude due to transmissions across the interfaces along the reflection raypath would be needed. Migration equation (1) becomes, upon insertion of synthetic data equation (2), $$U(\vec{x}) = \sum_j \Delta \vec{\xi}_j \frac{w(\vec{\xi}_j, \vec{x}) R(\vec{\xi}_j) \dot{g}(t + \tau_D(\vec{\xi}_j, \vec{x}) - \tau_R(\vec{\xi}_j))|_{t=0}}{\Lambda(\vec{\xi}_j)}. \tag{3}$$

The target-oriented imaging equation (3) can be implemented as an $O(N^4)$ process because the image location $\vec{x}$ may be restricted to only those points in image space that lie on the reflector surface.

In Kirchhoff migration in general, the set of $\vec{\xi}$ values summed over is referred to as the "migration aperture". Consider imaging equation (3) for some image point or reflection point $\vec{x}$ on the reflector. Schleicher et al., "Minimum Apertures and Fresnel Zones in Migration and Demigration", Geophysics, 62, 183–194, (1997), showed that the optimum migration aperture contains only those traces that are reflected from the Fresnel zone area surrounding image point $\vec{x}$. This result only applies for migrating synthetic data that are free of diffracting targets, since otherwise a large aperture is needed to adequately focus diffracted energy.

The formulas derived by Schleicher et al. (1993) and (1997) apply only to an idealized situation in which offset and azimuth are strictly constant and source-receiver spacing is uniform and dense. In addition, their discussion of Fresnel zones is in relation to theoretical considerations about migration aperture. They did not consider the idea, introduced here for the present invention, of using weighted sums of Fresnel zone amplitudes to construct model seismic images which respect the exact field acquisition geometry in which source-receiver offset and azimuth vary over the survey.

The paper "Quantifying Seismic Amplitude Distortions Below Salt" by D. R. Muerdter, R. O. Lindsey, and D. W. Ratcliff: 1997 Offshore Technology conference paper OTC 8339, discusses the effect of irregular reflector illumination. The authors sort the results of raytrace modeling into reflection-point gathers and then prepare and analyze reflection point bin maps around salt structures. However, this method is only an approximation of seismic amplitudes.

Thus, a need exists for a method of removing non-geologic amplitude effects without adversely affecting the quality of the resulting data. There is a need for a method to reveal the acquisition footprint by modeling the migrated image more accurately, more economically, and faster than can be achieved by direct implementation of migration equation (1). There is a need for a method that creates maps of the acquisition footprint that are consistent with known wave theory of how seismic images are formed.

SUMMARY OF THE INVENTION

The present invention is a method for constructing a model seismic image of a subsurface seismic reflector. First, a set of source and receiver pairs is located and a subsurface velocity function is determined. Specular reflection points are determined on the subsurface seismic reflector for each of the source and receiver pairs. A Fresnel zone is determined on the subsurface seismic reflector for each of the specular reflection points, using the subsurface velocity function. One or more seismic wavelets are selected. A set of image points is defined containing the subsurface seismic reflector. A synthetic seismic amplitude is determined at each of the image points by summing the Fresnel zone synthetic seismic amplitudes for all of the Fresnel zones that contain the image point, using the seismic wavelets. Finally, the model seismic image of the subsurface seismic reflector is constructed, using the synthetic seismic amplitudes at the image points.

BRIEF DESCRIPTION OF THE DRAWINGS

The present invention and its advantages may be more easily understood by reference to the following detailed description and the attached drawings in which.

While the invention will be described in connection with its preferred embodiments, it will be understood that the invention is not limited thereto. On the contrary, it is intended to cover all alternatives, modifications and equivalents that may be included within the spirit and scope of the invention, as defined by the appended claims.

DETAILED DESCRIPTION OF THE INVENTION

Traditional seismic image modeling approaches require separate computer runs of modeling software to create synthetic data and of migration software to image the data. These approaches can be cumbersome and time-consuming, often requiring supercomputers. The present invention is developed for modeling 3-D prestack migrated images of single reflectors for realistic acquisition geometries. The present invention combines prestack modeling and imaging into one step, allowing the creation of black box software that is very efficient and easy to use. The present invention, as implemented in the preferred embodiment, is simple and fast, requiring minutes on a workstation. Persons skilled in the art could easily develop computer software for use in implementing the present invention based on the teachings set forth here.

In the following, the general theory is described and then acquisition footprint prediction with the present invention for prestack 3-D time migration is demonstrated. The present invention shows how to reveal the acquisition footprint by modeling the migrated image efficiently and accurately. Note, however, that the present invention also applies to general variable velocity media and prestack 3-D depth migration. Thus, with an adequate ray tracing algorithm, wave equation modeling software could be created to efficiently model depth migrated images in real-world situations.

The present invention develops the Fresnel zone theory for variable source-receiver offset and azimuth. The restriction of the summation over $\vec{\xi}_j$ for each image point $\vec{x}$ allows imaging equation (3) to be implemented as an O($N^3$) process. This "target-oriented imaging" may be performed efficiently on a single workstation. A particular embodiment of the present invention as a software tool has been produced that specializes the theory to prestack 3-D time migration, for planar reflectors, where the velocity varies with depth only, that is, a v(z) medium. This embodiment models the subsurface illumination or acquisition footprint caused by specific acquisition geometries.

Figure 1:
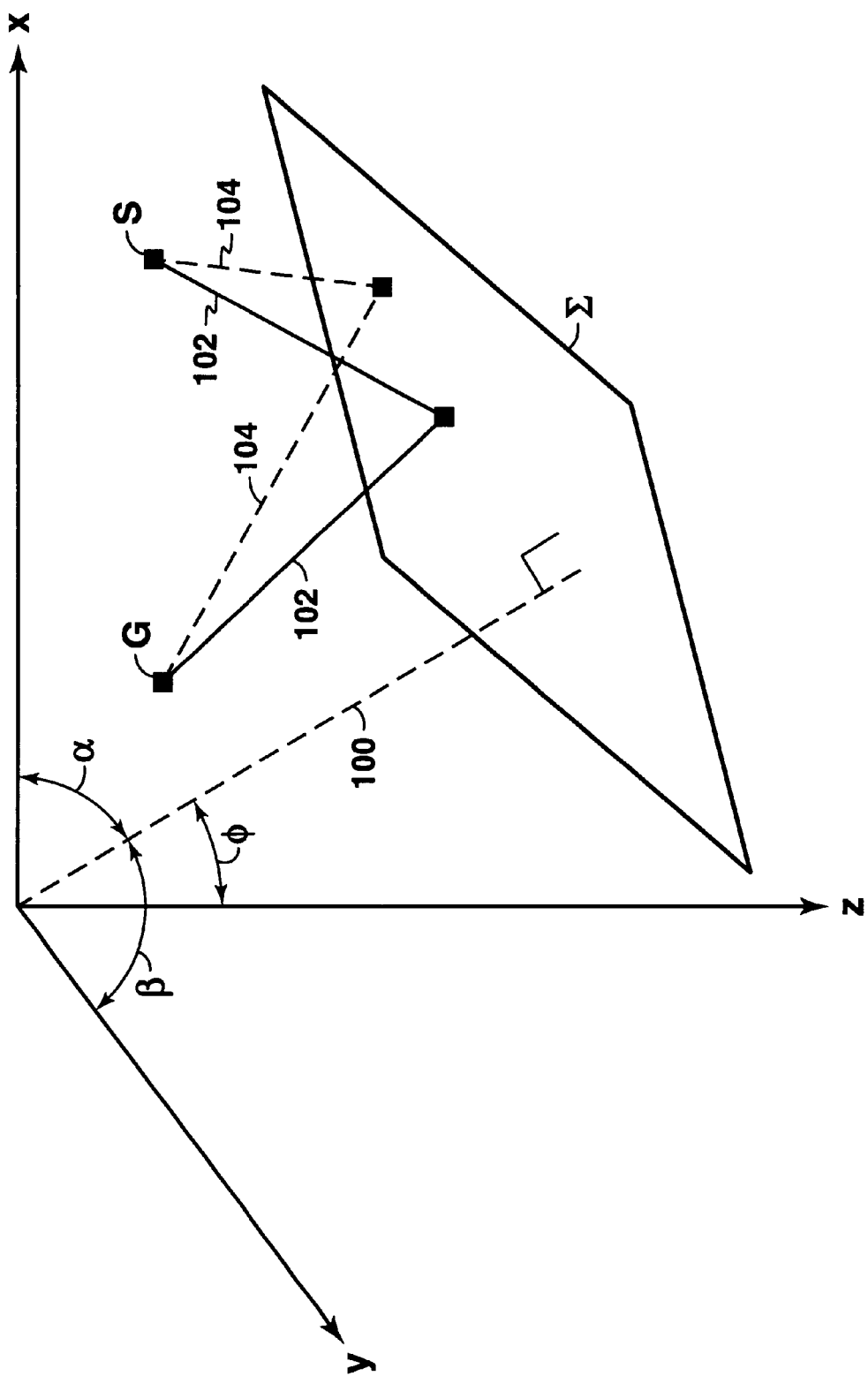
FIG. 1 is an illustration of the geometry of a dipping planar reflector relative to source, receiver, and reflection points.

Here the present invention is described for arbitrary velocity models and planar reflectors. FIG. 1 shows a dipping planar reflector Σ with normal vector 100 making angles α, β, and φ with the x, y, and z axes, respectively. A reflection path connecting source S and receiver G to specular reflection point Q on the reflector Σ is illustrated with solid raypath 102. A diffraction path connecting S and G to nonspecular point Q' on the reflector Σ is illustrated with dashed raypath 104.

For a wave with pulse length T, the Fresnel zone relative to a surface Σ is defined as the set of all points Q' on surface Σ for which $$|\tau(S,Q')+\tau(Q',G)-\tau(S,G)| \leq T/2 \tag{4}$$

Here τ(S, Q') is the one-way seismic signal traveltime connecting points S and Q', τ(Q', G) is the one-way seismic signal traveltime connecting points Q' and G, and τ(S, G) is the two-way reflection traveltime from points S to Q to G for specular reflection point Q. Thus, all points Q' on the surface Σ define the Fresnel zone on that surface, if the sum of traveltimes from S to Q' and from Q' to G does not differ from the traveltime along specular ray SG by more than half of pulse length T. Surface Σ may be a planar reflector or the tangent plane at a specular reflection point Q on the surface of a gently curving reflector.

The Fresnel zone may be further described in terms of its boundary, the Fresnel zone ellipse, and using the Fresnel zone matrix H. The Fresnel zone ellipse is derived by selecting Cartesian coordinates $\vec{r} = (r_1, r_2)^T$ on the plane tangent to the reflector Σ at specular reflection point Q so that $r_1$ and $r_2$ are dip and strike direction, respectively, from Q. The nonspecular reflection point Q', relative to Q, is expressed through nonzero values of $\vec{r}$. The diffraction traveltime $\tau_D$ and reflection traveltime $\tau_R$ are defined by $$\tau_D(S, Q', G) = \tau(S, Q') + \tau(Q', G), \tag{5}$$

$$\tau_R(S, G) = \tau(S, G) \equiv \tau(S, Q) + \tau(Q, G). \tag{6}$$

Expanding diffraction traveltime $\tau_D$ from equation (5) in a second-order Taylor series in coordinates $\vec{r} = (r_1, r_2)^T$ about origin Q yields $$\tau_D(S,Q',G) \approx \tau_R(S,G) + \tfrac{1}{2} \vec{r}^T H \vec{r}. \tag{7}$$

The first term in this expansion vanishes by Fermat's principle since point Q is the specular reflection point. Inserting this result into the Fresnel zone inequality (4) yields $$\vec{r}^T H \vec{r} = T \tag{8}$$

after taking the equality. Taking the equality gives the Fresnel ellipse, the boundary of the Fresnel zone. In the above, H is the 2×2 symmetric Fresnel zone matrix defined by $$H_{i,j} = \frac{\partial^2 \tau_D}{\partial r_i \partial r_j}, \quad \text{for } i=1,2 \text{ and } j=1,2. \tag{9}$$

The components of H can be explicitly computed as:

$$\frac{\partial^2 \tau_D}{\partial r_1^2} = \frac{1}{\sin^2 \phi}[\tau_{xx}\cos^2\alpha\cos^2\phi + \tau_{yy}\cos^2\beta\cos^2\phi + \tau_{zz}\sin^4\phi + \tag{10}$$

$$2\tau_{xy}\cos\alpha\cos\beta\cos^2\phi - 2\tau_{xz}\cos\alpha\cos\phi\sin^2\phi -$$

$$2\tau_{yz}\cos\beta\cos\phi\sin^2\phi]$$

$$\frac{\partial^2 \tau_D}{\partial r_1 \partial r_2} = \frac{1}{\sin^2\phi}[(\tau_{yy}-\tau_{xx})\cos\alpha\cos\beta\cos\phi + \tag{11}$$

$$\tau_{xy}(\cos^2\alpha - \cos^2\beta)\cos\phi +$$

$$\tau_{xz}\cos\beta\sin^2\phi - \tau_{yz}\cos\alpha\sin^2\phi]$$

$$\frac{\partial^2 \tau_D}{\partial r_2^2} = \frac{1}{\sin^2\phi}[\tau_{xx}\cos^2\beta + \tau_{yy}\cos^2\alpha - 2\tau_{xy}\cos\alpha\cos\beta] \tag{12}$$

In the Fresnel zone matrix equations (10)–(12), $\tau_{xx}, \tau_{yy}, \tau_{zz}, \tau_{xy}, \tau_{xz},$ and $\tau_{yz}$ represent second derivatives of the diffraction traveltime $\tau_D$ of equation (5) with respect to global Cartesian coordinates $\vec{x} = (x, y, z)$ and evaluated at the specular reflection point Q on the reflector Σ. Equations (10)–(12) are valid for general velocity models v(x, y, z). These derivatives are computed for fixed source S and receiver G. The derivatives may be computed precisely, with dynamic ray tracing, or approximately, using finite-differences of the traveltime fields. The three independent components of the symmetric Fresnel zone matrix determine the major and minor elliptical axes and orientation of the Fresnel zone ellipse and thus define the size, shape, and orientation of the Fresnel zone.

Transforming synthetic data equation (2) and imaging equation (3) from surface midpoint coordinates, $\vec{\xi}_j$, for trace j, to Cartesian coordinates, $\vec{\eta}_j$, in the plane of the reflector, results in $$U(\vec{\eta}_j, t) = \frac{R(\vec{\eta}_j)g(t - \tau_R(\vec{\eta}_j))}{\Lambda(\vec{\eta}_j)J(\vec{\eta}_j)} \quad \text{and} \tag{13}$$

$$U(\vec{x}) = \sum_j \Delta\vec{\eta}_j \frac{w(\vec{\eta}_j, \vec{x})R(\vec{\eta}_j)g(t + \tau_D(\vec{\eta}_j, \vec{x}) - \tau_R(\vec{\eta}_j))|_{t=0}}{\Lambda(\vec{\eta}_j)J(\vec{\eta}_j)}. \tag{14}$$

Here the midpoint coordinate $\vec{\xi}_j$ has been replaced by the reflection point $\vec{\eta}_j$ is for each trace j and J represents the Jacobian of the coordinate transformation $$\Delta\vec{\eta}_j = J\Delta\vec{\xi}_j. \tag{15}$$

Transformed synthetic data equation (13) and imaging equation (14) are advantageous because it is particularly easy to restrict the summation over reflection points $\vec{\eta}_j$ to the appropriate Fresnel zone. Further, the weight function w simplifies to $$w(\vec{\eta}_j, \vec{x}) = J\Lambda(\vec{\eta}_j)\sqrt{\det H} \tag{16}$$

where $H = H(\vec{\eta}_j, \vec{x})$ is the Fresnel zone matrix defined by equations (9)–(12). Inserting weight equation (16) into imaging equation (14) produces $$U(\vec{x}) = \sum_j \Delta\vec{\eta}_j \sqrt{\det H} \, R(\vec{\eta}_j)g(t + \tau_D(\vec{\eta}_j, \vec{x}) - \tau_R(\vec{\eta}_j))\bigg|_{t=0}. \tag{17}$$

Inserting traveltime equation (7) into imaging equation (17) yields $$U(\vec{x}) = \sum_j \Delta\vec{\eta}_j \sqrt{\det H} \, R(\vec{\eta}_j)g(t + \vec{r}_j^T H \vec{r}_j)\bigg|_{t=0}, \tag{18}$$

where $\vec{r}_j = \vec{r}_j(\vec{\eta}_j, \vec{x})$ is the distance vector, in the plane of the reflector, that connects the reflection point $\vec{\eta}_j$ and the image point $\vec{x}$. Imaging equation (18) represents the best formulation of Fresnel zone imaging theory on the surface of the imaged reflector. The geometric spreading $\Lambda$ and the Jacobian J are eliminated, and the Fresnel zone matrix H controls the amplitudes. Imaging equation (18) precisely and efficiently models the migrated image. Further, imaging equations (17) and (18) are valid for general velocity models.

Calculating seismic attributes related to the wavelet in the migrated data requires considering points within an elliptic cylinder which is the extension of the Fresnel zone perpendicular to the reflector surface a distance of approximately a wavelength above and below the reflector. To achieve this with maximum computational efficiency, a first order Taylor expansion is made perpendicular to the reflector and the equation $$\frac{\partial \tau_D}{\partial n} = \frac{2\cos\alpha}{v} \tag{19}$$

is employed, where $\alpha$ is the ray incidence angle relative to the normal vector on the reflector, v is the local seismic velocity and n is the perpendicular distance from the surface of the reflector. For a small distance $\delta n$ in the n direction, that is, for a value of $\delta n$ less than approximately a wavelength, equation (18) becomes $$U(\vec{x}) = \sum_j \Delta\vec{\eta}_j \sqrt{\det H} \, R(\vec{\eta}_j)\dot{g}\left(\frac{2\cos\alpha}{v}\delta n + \vec{r}_j^T H \vec{r}_j\right) \tag{20}$$

Equation (20) can be used to calculate all seismic attributes on the surface of the reflector given only the rays that reflect directly from the surface of the reflector. Since Fresnel zones vary slowly in a direction perpendicular to the reflector, the Fresnel zone on the reflector surface can be used for such points adjacent the reflector.

Figure 2:
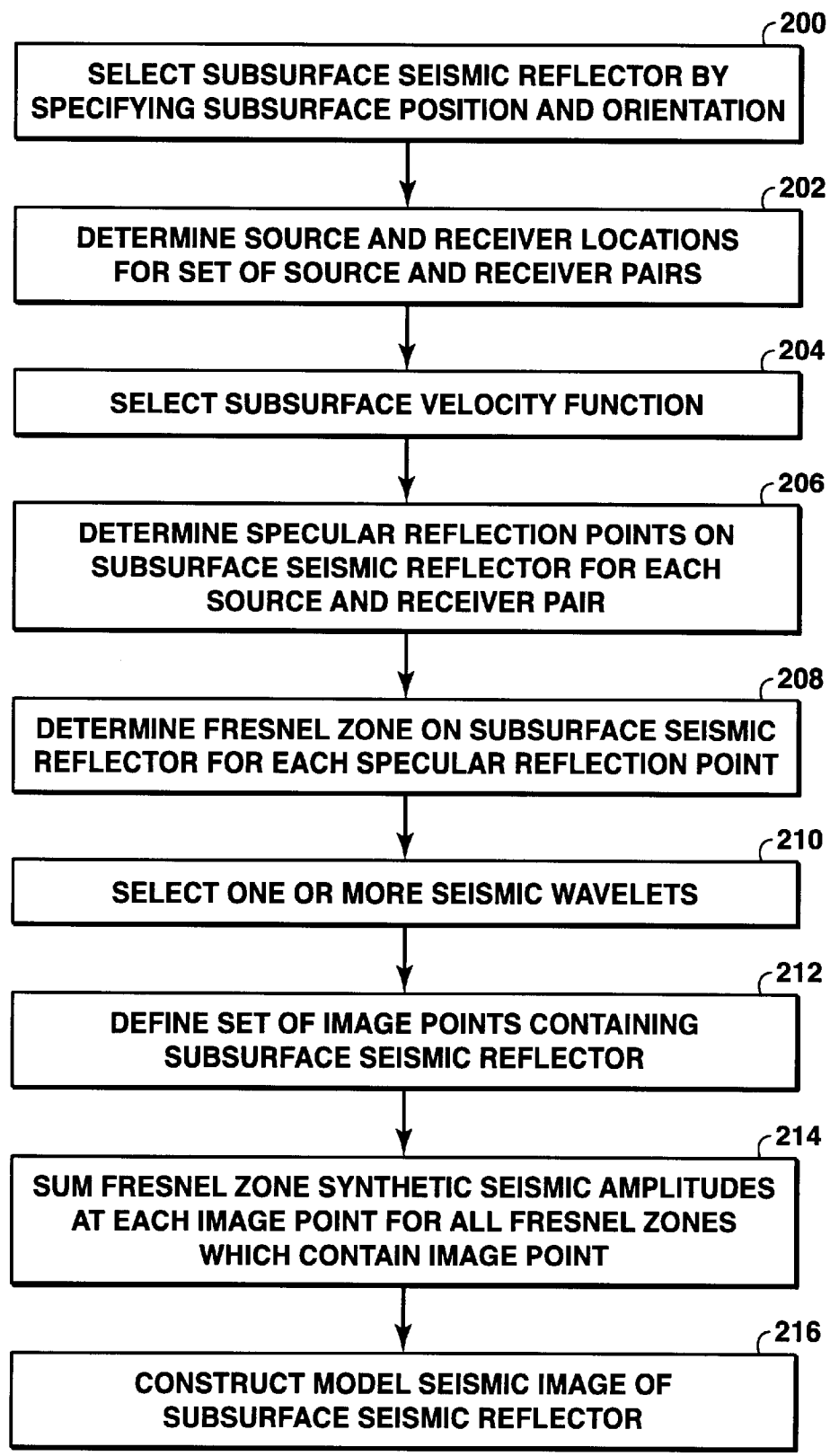
FIG. 2 is a flow chart illustrating the processing steps for one embodiment of the method of the present invention.

FIG. 2 is a flow chart that illustrates one embodiment of the method of the present invention for constructing a model seismic image of a subsurface seismic reflector. First, at step 200, a subsurface seismic reflector is selected. Typically, the seismic reflector is selected from among the reflectors of interest to the processing of the seismic data set of interest. Preferably, the seismic reflector is given by specifying a subsurface position and orientation. Second, at step 202, source and receiver locations for a set of source and receiver pairs are determined. Preferably, these source and receiver pairs are selected to provide common-offset gathers in the seismic data set of interest, using standard seismic processing techniques well known to those skilled in the art. These source and receiver pairs will be used in determining specular reflection points below. Next, at step 204, a subsurface velocity function is selected. Preferably, this velocity function is that which is used in the seismic processing of the data set of interest. This subsurface velocity function will be used in determining Fresnel zones below.

Next, at step 206, specular reflection points on the subsurface seismic reflector from step 200 are determined for each of the source-receiver pairs from step 202. Preferably, these specular reflection points are determined by ray tracing. Next, at step 208, a Fresnel zone on the subsurface seismic reflector from step 200 is determined for each of the specular reflection points from step 206, using the subsurface velocity function from step 204. Preferably, the Fresnel zone on the subsurface seismic reflector is determined by size, shape, and orientation of the Fresnel zone ellipse on the subsurface seismic reflector. Preferably, the size, shape, and orientation of the Fresnel zone ellipse are determined from the calculated elements of a Fresnel zone matrix. Preferably, the elements of the Fresnel zone matrix are calculated using equations (10)–(12), above.

Next, at step 210, one or more seismic wavelets are selected. Preferably, the seismic wavelets are selected to match the expected seismic wavelets at depth at the reflector of interest from step 200. Typically, this is determined by examination of the seismic data set of interest. Next, at step 212, a set of image points is defined containing the subsurface seismic reflector from step 200. Preferably, the set of image points is defined depending upon the seismic attributes of interest. Typically, attributes such as amplitude are determined by image points on the reflector, while attributes such as pulse length are determined by including a volume of image points within approximately a spatial wavelength of the reflector.

Next, at step 214, a synthetic seismic amplitude is determined for each of the image points from step 212 by summing Fresnel zone synthetic seismic amplitudes for all of the Fresnel zones from step 208 which contain the image point, using the seismic wavelets from step 210. For a set of image points on the seismic reflector, this summing is preferably done using imaging equation (18) above.

However, for a set of image points that include points not on but within approximately a spatial wavelength of the seismic reflector, the summing is preferably done using imaging equations (17) or (20), with equation (20) being computationally more efficient. Use of equations (17), (18), or (20) makes it easy to restrict the summation to reflection points on the appropriate Fresnel zone. Since Fresnel zones vary slowly in a direction perpendicular to the reflector, for such points adjacent the reflector, the Fresnel zone on the reflector surface is preferably used. Finally, at step 216, the model seismic image of the subsurface seismic reflector from step 200 is constructed using the synthetic seismic amplitudes from step 214 at the image points from step 212. Typically, this construction is accomplished using standard imaging techniques well known to those skilled in the art.

EXAMPLE

Figure 6:
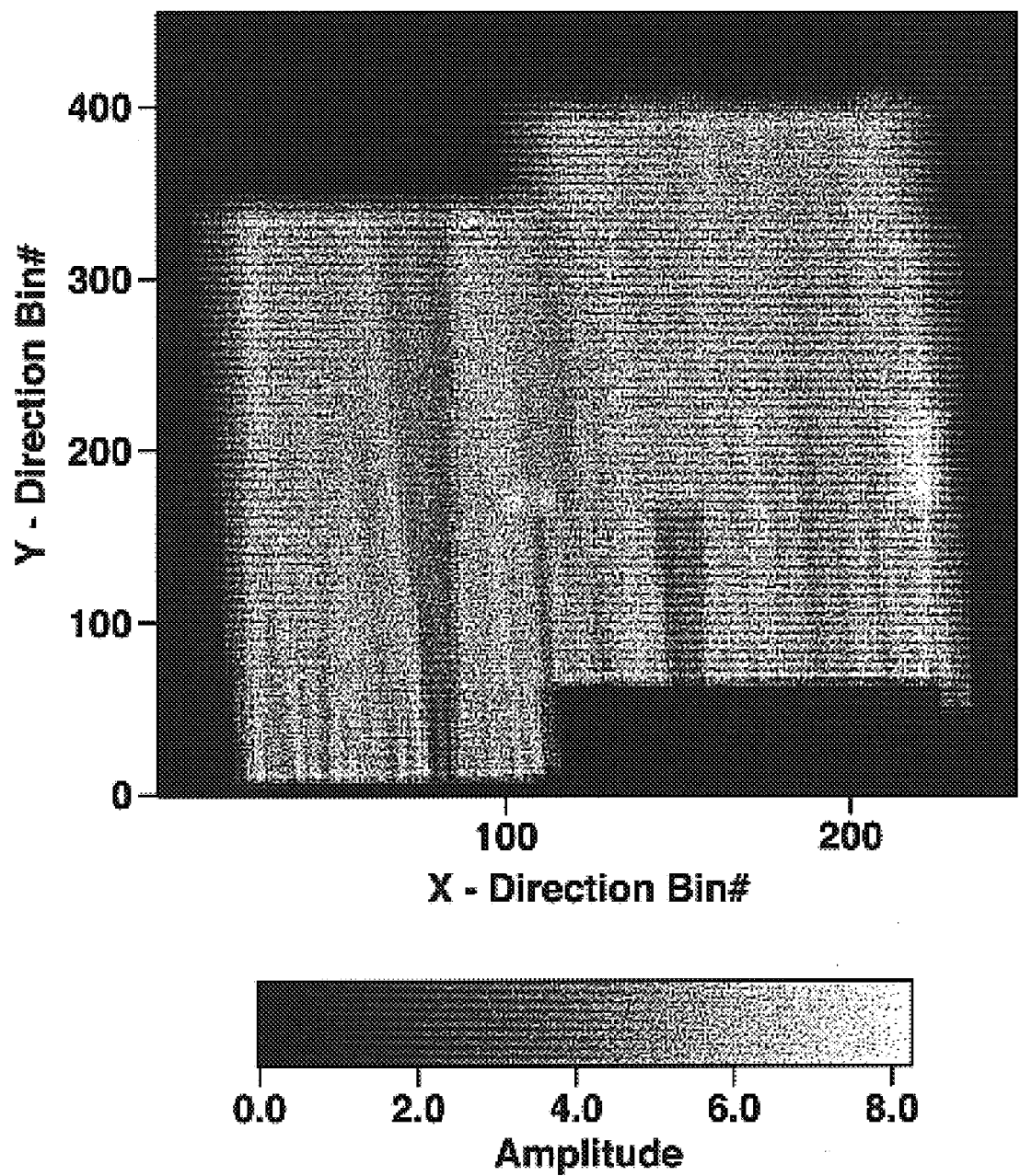
FIG. 6 is a plot of 3-D time migrated synthetic data for the planar reflector dipping in the inline direction of the example.
Figure 7:
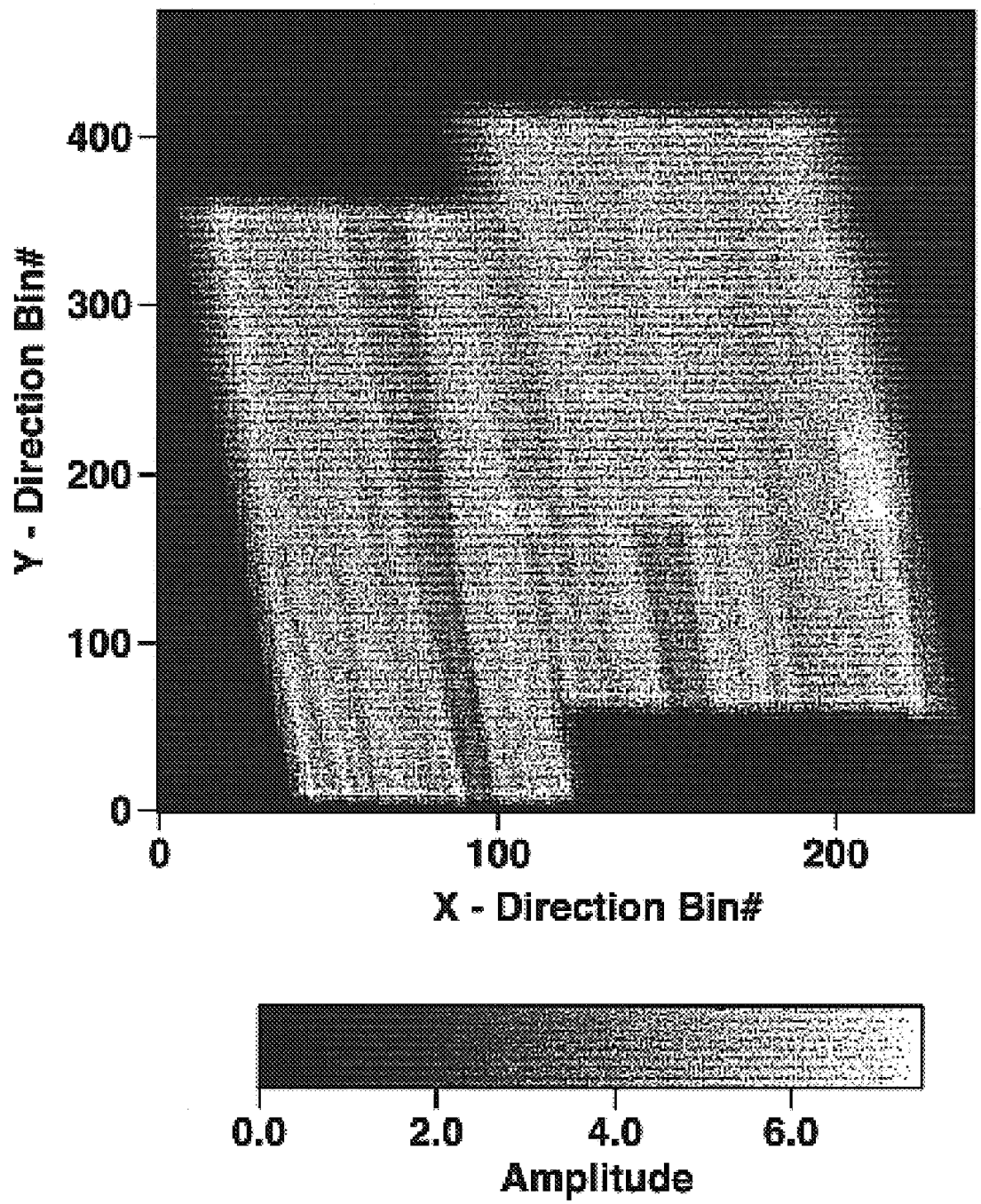
FIG. 7 is a plot of 3-D time migrated synthetic data for the planar reflector dipping 45 degrees between the inline and crossline directions of the example.
Figure 8:
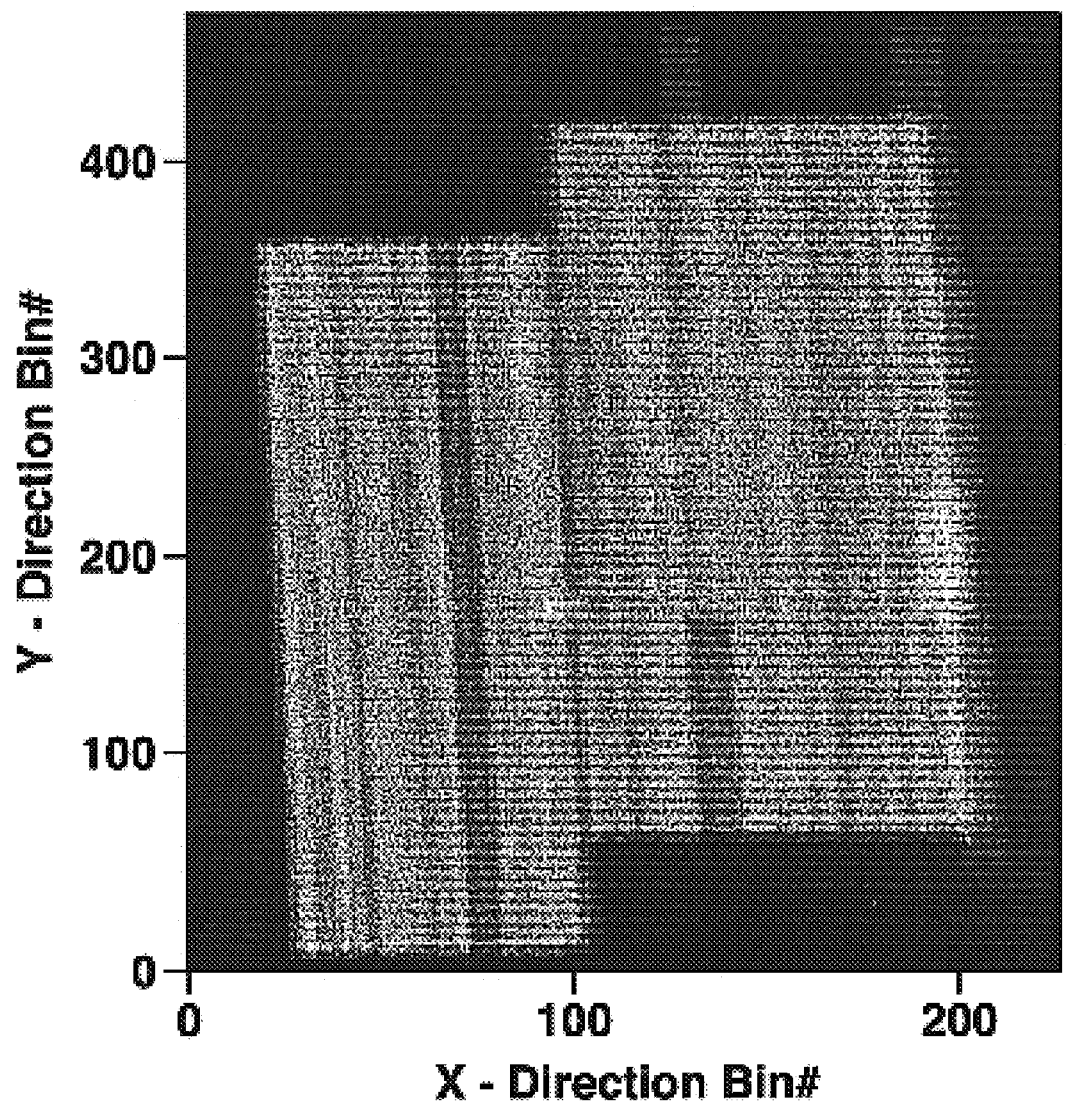
FIG. 8 is a plot of 3-D time migrated synthetic data for the planar reflector dipping in the crossline direction of the example.
Figure 8:
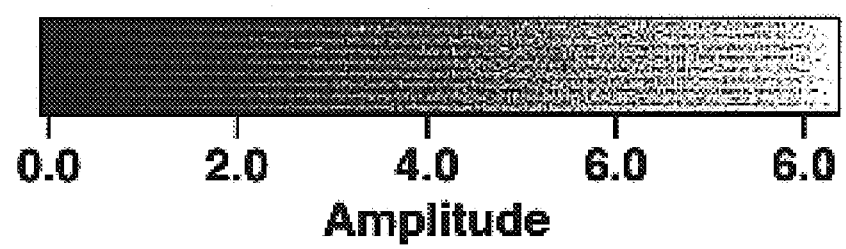

Imaging equation (17), (18) and (20) have been implemented for a v(z) medium to test the image modeling technique for time migration applications, which form the majority of cases of practical exploration interest. Imaging equations (17), (18) and (20) can be implemented as code that runs on a single workstation. The code may be specialized for calculating acquisition footprints or illumination by setting R=1.0 and holding $\Delta \vec{\eta}_j$ constant. Thus, any deviation of the output amplitudes from a value of 1.0 represents the footprint. Only source and receiver coordinates, a v(z) velocity function, and the parameters defining a reflecting plane of interest are required to be provided. The program outputs an amplitude horizon slice through the reflector image for plotting, as illustrated in FIGS. 6, 7, and 8, discussed below. Output data sets for seismic attribute calculations may also be generated.

Figure 3:
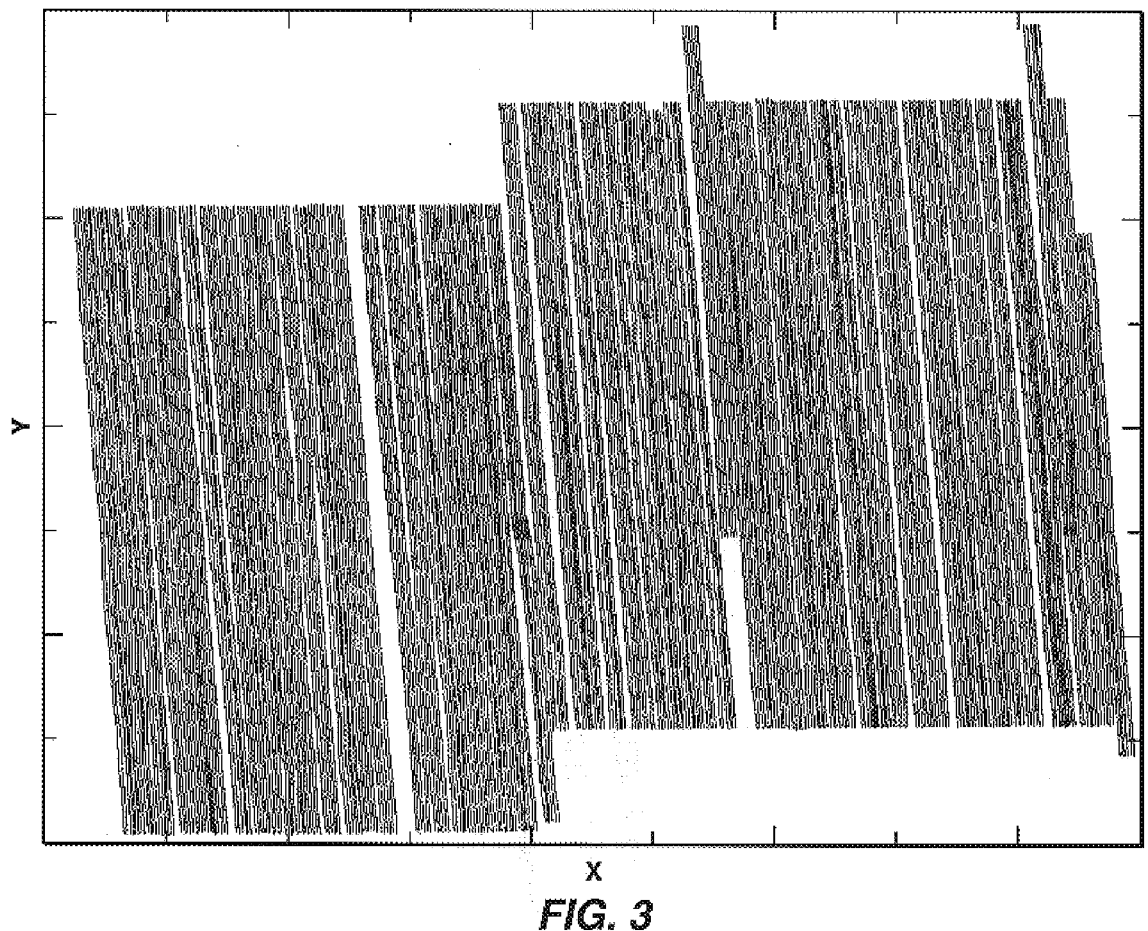
FIG. 3 is a map view of the source-receiver midpoints for the example.

FIG. 3 shows almost 400,000 source-receiver midpoints representing a collection of 2000-meter common-offset traces from a marine seismic survey.

Figure 4:
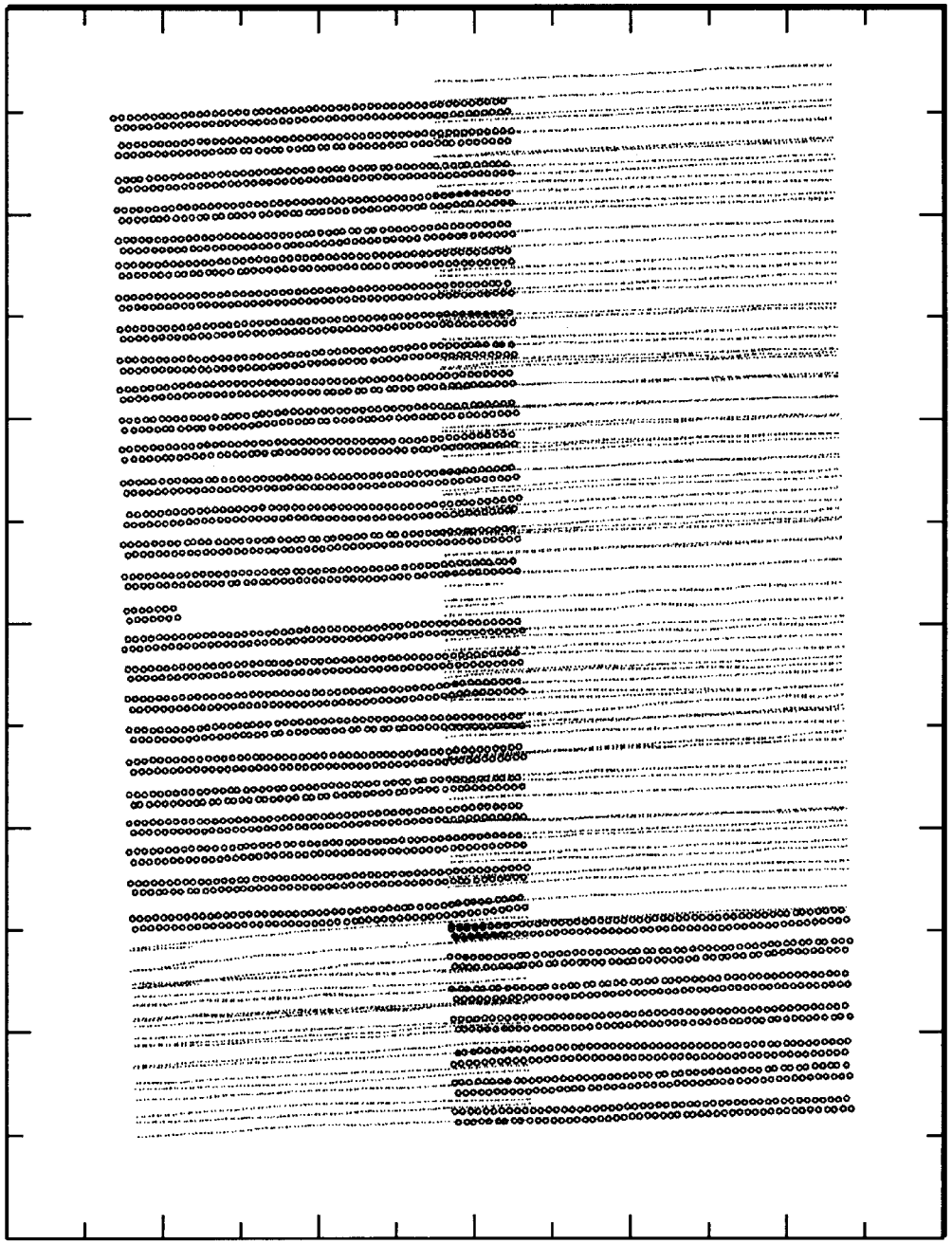
FIG. 4 is a map view of a portion of the source and receiver locations for the example.

Acquisition used a 2-source, 3-cable configuration. FIG. 4 shows the source-receiver positions from just 40,000 of the traces represented in FIG. 3. FIG. 4 illustrates that while source positions 400 are relatively uniform, cable feathering caused significant variations in receiver positions 402. However, missing source lines caused large data gaps 404. FIG. 4 also shows a 180-degree change 406 caused by reversal of the shooting direction.

Figure 5:
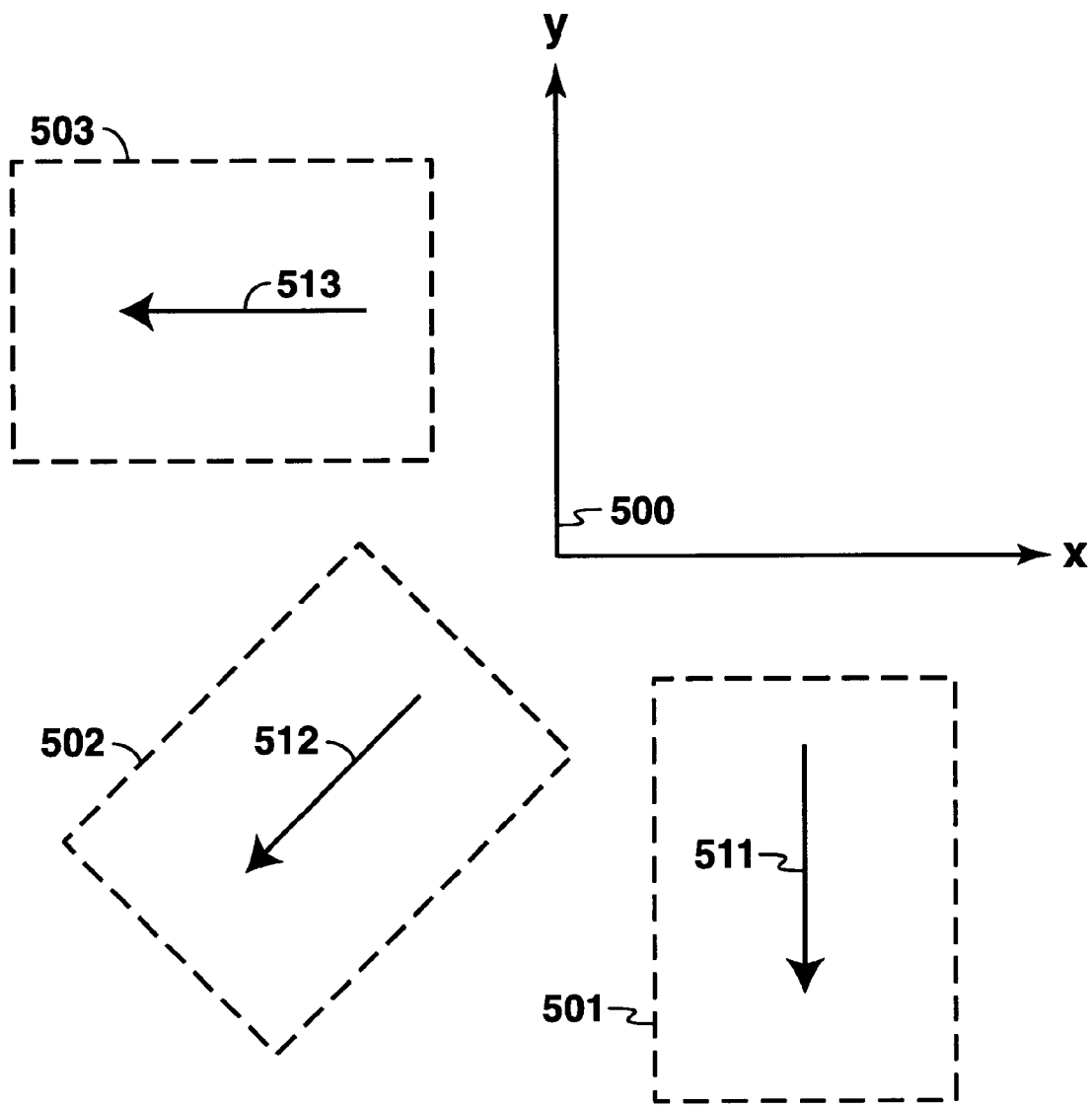
FIG. 5 is a an illustration of the geometry of the dipping planar reflections used in the example.

The 400,000 source and receiver positions were fed into the seismic image modeling program, and using v(z)=1525+ 0.4 z meters/sec for the velocity function, 3-D migrated images for prestack data from three planar reflectors were obtained. FIG. 5 shows the orientation of these planes to the surface X-Y coordinates 500 of FIGS. 3 and 4. All three planes 501, 502, and 503 dip at 25 degrees, with the updip directions shown by the arrows 511, 512, and 513, respectively, in FIG. 5.

FIGS. 6, 7, and 8 are amplitude horizon slices through the migrated images of reflector planes 501, 502, and 503, respectively, from FIG. 5. These plots were constructed by vertically projecting the migrated image of each reflector onto the surface of the X-Y plane. Each image was computed on a Sun Sparc 10 workstation in a few minutes. The images all show a similar acquisition footprint that appears as vertical stripes in the inline direction. Reflector plane 502 was oblique to the inline direction, which caused the skewed footprint image in FIG. 7. The amplitude variations in these images correlate well with the source-receiver midpoint variations of FIG. 3. Regions of high midpoint density caused amplitude highs, and regions of low midpoint density caused amplitude lows.

The images in FIGS. 6, 7, and 8 show highest definition or resolution where the dipping reflectors were shallowest, and this illustrates how Fresnel zones control imaging. These regions of shallowest reflector depth are at the bottom edge of FIG. 6, bottom-left corner of FIG. 7, and the left edge of FIG. 8, recalling the geometry of FIG. 5. Thus, the acquisition footprint is most pronounced on shallow reflectors.

It should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for constructing a model seismic image of a subsurface seismic reflector, said method comprising the steps of:

locating a set of source and receiver pairs to be used in constructing said model seismic image;

determining a subsurface velocity function to be used in constructing said model seismic image;

determining specular reflection points on said subsurface seismic reflector for each of said source and receiver pairs;

determining a Fresnel zone on said subsurface seismic reflector for each of said specular reflection points, using said subsurface velocity function;

selecting one or more seismic wavelets to be used in constructing said model seismic image;

defining a set of image points containing said subsurface seismic reflector;

determining a synthetic seismic amplitude at each of said image points by summing Fresnel zone synthetic seismic amplitudes for all of said Fresnel zones which contain said image point, using said one or more seismic wavelets; and constructing said model seismic image of said subsurface seismic reflector using said synthetic seismic amplitudes at said image points.

2. The method of claim 1, wherein said step of summing said Fresnel zone synthetic seismic amplitude at each said image point is accomplished using the following sum $$U(\vec{x}) = \sum_j \Delta \vec{\eta}_j \sqrt{detH} \, R(\vec{\eta}_j) \dot{g}(t + \tau_D(\vec{\eta}_j, \vec{x}) - \tau_R(\vec{\eta}_j)) \bigg|_{t=0},$$

where U is said synthetic seismic amplitude sum, $\vec{x}$ is a image point, $\vec{\eta}_j$ is a reflection point for trace j, $\Delta \vec{\eta}_j$ is a surface area element for trace j in Cartesian coordinates in the plane of said subsurface seismic reflector, H is a Fresnel zone matrix, R is a reflection coefficient for said subsurface seismic reflector, g is said seismic wavelet, wherein the dot represents a time derivative, $\tau_D$ is diffraction traveltime, and $\tau_R$ is reflection traveltime.

3. The method of claim 1, wherein said step of summing said Fresnel zone synthetic seismic amplitude at each said image point is accomplished using the following sum $$U(\vec{x}) = \sum_j \Delta\vec{\eta}_j \sqrt{detH}\, R(\vec{\eta}_j)\dot{g}(t + \vec{r}_j^T H \vec{r}_j)\bigg|_{t=0},$$

where U is said seismic amplitude sum, $\vec{r}_j$ is a distance vector, in the plane of said subsurface seismic reflector, that connects reflection point $\vec{\eta}_j$ and image point $\vec{x}$ for trace j, $\Delta\vec{\eta}_j$ is a surface area element for trace j in Cartesian coordinates in the plane of said subsurface seismic reflector, H is a Fresnel zone matrix, R is a reflection coefficient for said subsurface seismic reflector, and g is said seismic wavelet, wherein the dot represents a time derivative.

4. The method of claim 1, wherein said step of summing said Fresnel zone synthetic seismic amplitude at each said image point is accomplished using the following sum $$U(\vec{x}) = \sum_j \Delta\vec{\eta}_j \sqrt{detH}\, R(\vec{\eta}_j)\dot{g}\left(\frac{2\cos\alpha}{v}\delta n + \vec{r}_j^T H \vec{r}_j\right),$$

where U is said seismic amplitude sum, $\vec{r}_j$ is a distance vector, in the plane of said subsurface seismic reflector, that connects reflection point $\vec{\eta}_j$ and image point $\vec{x}$ for trace j, $\Delta\vec{\eta}_j$ is a surface area element for trace j in Cartesian coordinates in the plane of said subsurface seismic reflector, H is a Fresnel zone matrix, R is a reflection coefficient for said subsurface seismic reflector, $\alpha$ is a reflection angle, v is a local seismic velocity at said reflection point $\vec{\eta}_j$, and g is said seismic wavelet, wherein the dot represents a time derivative.

5. The method of claim 1, wherein said step of determining said Fresnel zone comprises the steps of:

calculating a Fresnel zone matrix for each of said specular reflection points on said subsurface seismic reflector; and determining size, shape, and orientation of said Fresnel zone from said Fresnel zone matrix.

6. The method of claim 1, wherein said subsurface velocity function varies with depth only.

\* \* \* \* \*